United States Patent
J S (10) Patent No.: US 12,120,093 B1
(45) Date of Patent: Oct. 15, 2024

(54) PROVIDING SUBSCRIBER AWARE NETWORK ADDRESS FILTERING USING AN OPEN CONFIGURATION REMOTE PROCEDURE CALL FRAMEWORK

(71) Applicant: Juniper Networks, Inc., Sunnyvale, CA (US)

(72) Inventor: Sheeja J S, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/189,552

(22) Filed: Mar. 24, 2023

(51) Int. Cl.
*G06F 15/173* (2006.01)
*H04L 9/40* (2022.01)
*H04W 8/20* (2009.01)

(52) U.S. Cl.
CPC ........ *H04L 63/0236* (2013.01); *H04L 63/101* (2013.01); *H04W 8/20* (2013.01)

(58) Field of Classification Search
CPC ..... H04L 63/0236; H04L 63/101; H04W 8/20
See application file for complete search history.

(56) References Cited

U.S. PATENT DOCUMENTS

| | | | | |
|---|---|---|---|---|
| 7,822,707 | B1 * | 10/2010 | Yehuda | G06F 16/248 707/792 |
| 2006/0080444 | A1 * | 4/2006 | Peddemors | H04L 63/101 709/227 |
| 2016/0259699 | A1 * | 9/2016 | Greenspan | G06F 11/3409 |
| 2023/0133444 | A1 * | 5/2023 | Dimitrovski | H04L 63/0236 370/331 |

* cited by examiner

*Primary Examiner* — Wing F Chan
*Assistant Examiner* — Joseph R Maniwang
(74) *Attorney, Agent, or Firm* — Harrity & Harrity, LLP (57) ABSTRACT

A network device may provide a request for blacklists specific to respective subscribers. The network device may receive a first blacklist of network addresses associated with a first subscriber and a second blacklist of network addresses associated with a second subscriber. The network device may receive first traffic associated with a first network address and destined for the first subscriber, and may determine whether the first network address is included in the first blacklist. The network device may prevent the first traffic from being provided to the first subscriber when the network address is included in the first blacklist, or may allow the first traffic to be provided to the first subscriber when the network address is not included in the first blacklist.

20 Claims, 9 Drawing Sheets

PROVIDING SUBSCRIBER AWARE NETWORK ADDRESS FILTERING USING AN OPEN CONFIGURATION REMOTE PROCEDURE CALL FRAMEWORK

BACKGROUND

Network address (e.g., uniform resource locator (URL) or web) filtering is a feature that is used to filter out blacklisted traffic for all subscribers (e.g., endpoint devices) based on a subscriber-provided network address (e.g., URL) database provided in a network device. Domain name system (DNS) resolution may be provided for each network address in the network address database. The network device may receive and block prohibited traffic (e.g., blacklisted traffic) based on the network address database. Alternatively, the network device may receive and allow legitimate traffic based on the network address database.

SUMMARY

Some implementations described herein relate to a method. The method may include providing a request for blacklists of network addresses specific to respective subscribers of a plurality of subscribers. The method may include receiving, based on the request, a first blacklist of network addresses associated with a first subscriber of the plurality of subscribers and a second blacklist of network addresses associated with a second subscriber of the plurality of subscribers. The method may include receiving first traffic associated with a first network address and destined for the first subscriber, and determining whether the first network address is included in the first blacklist. The method may include selectively preventing the first traffic from being provided to the first subscriber based on the network address being included in the first blacklist, or allowing the first traffic to be provided to the first subscriber based on the network address not being included in the first blacklist.

Some implementations described herein relate to a network device. The network device may include one or more memories and one or more processors. The one or more processors may be configured to provide a request for blacklists of network addresses specific to respective subscribers of a plurality of subscribers. The one or more processors may be configured to receive, based on the request, a first blacklist of network addresses associated with a first subscriber of the plurality of subscribers and a second blacklist of network addresses associated with a second subscriber of the plurality of subscribers, where the request is a subscription request subscribing to the first subscriber, the first blacklist, the second subscriber, and the second blacklist. The one or more processors may be configured to receive first traffic associated with a first network address and destined for the first subscriber, and determine whether the first network address is included in the first blacklist. The one or more processors may be configured to selectively prevent the first traffic from being provided to the first subscriber based on the network address being included in the first blacklist, or allow the first traffic to be provided to the first subscriber based on the network address not being included in the first blacklist.

Some implementations described herein relate to a non-transitory computer-readable medium that stores a set of instructions. The set of instructions, when executed by one or more processors of a network device, may cause the network device to provide a request for blacklists of network addresses specific to respective subscribers of a plurality of subscribers. The set of instructions, when executed by one or more processors of the network device, may cause the network device to receive, based on the request, a first blacklist of network addresses associated with a first subscriber of the plurality of subscribers and a second blacklist of network addresses associated with a second subscriber of the plurality of subscribers, where the request is an open configuration remote procedure call subscribing to the first subscriber, the first blacklist, the second subscriber, and the second blacklist. The set of instructions, when executed by one or more processors of the network device, may cause the network device to receive first traffic associated with a first network address and destined for the first subscriber, and determine whether the first network address is included in the first blacklist. The set of instructions, when executed by one or more processors of the network device, may cause the network device to selectively prevent the first traffic from being provided to the first subscriber based on the network address being included in the first blacklist, or allow the first traffic to be provided to the first subscriber based on the network address not being included in the first blacklist.

DETAILED DESCRIPTION

The following detailed description of example implementations refers to the accompanying drawings. The same reference numbers in different drawings may identify the same or similar elements.

Open configuration remote procedure call (gRPC) is a high performance RPC framework that can execute in any network environment. For example, a network device may include an RPC model that enables a telemetry interface of the network device. The network device may include a programmatic interface that defines a telemetry gRPC service. The telemetry gRPC service may specify subscription parameters, such as an open configuration path that identifies a resource to stream telemetry data (e.g., "/interfaces/interface/state/counters/"), an interval at which telemetry data is reported and streamed to a server device (e.g., "sample frequency=4000 milliseconds"), and/or the like. However, when there are different sets of blacklisted network addresses (e.g., URLs) for different subscribers (e.g., subscriber classes), the network device is unable to perform network address filtering for the different sets of blacklisted network addresses since the existing network address database is a common database for all subscribers.

Thus, current techniques for performing network address filtering consume computing resources (e.g., processing resources, memory resources, communication resources, and/or the like), networking resources, and/or the like, associated with failing to filter different sets of blacklisted network addresses for different subscribers, erroneously providing blacklisted traffic to the different subscribers associated with the different sets of blacklisted network addresses, handling network outages caused by the blacklisted traffic, handling compromised endpoint devices caused by the blacklisted traffic, and/or the like.

Some implementations described herein relate to a network device that provides subscriber aware network address filtering using an open configuration RPC framework. For example, a network device may provide a request for blacklists of network addresses specific to respective subscribers of a plurality of subscribers. The network device may receive, based on the request, a first blacklist of network addresses associated with a first subscriber of the plurality of subscribers and a second blacklist of network addresses associated with a second subscriber of the plurality of subscribers. The network device may receive first traffic associated with a first network address and destined for the first subscriber, and may determine whether the first network address is included in the first blacklist. The network device may prevent the first traffic from being provided to the first subscriber based on the network address being included in the first blacklist. Alternatively, the network device may allow the first traffic to be provided to the first subscriber based on the network address not being included in the first blacklist.

In this way, the network device provides subscriber aware network address filtering using an open configuration RPC framework. For example, the network device may provide a subscriber class and/or prefix (e.g., or an identifier of a subscriber) aware network address filtering of blacklisted traffic for specific subscribers. The network device may utilize the open configuration gRPC framework for subscribing to a subscriber class/prefix, blacklisted network addresses associated with the subscriber class/prefix, and streaming requirements for telemetry data associated with the blacklisted network addresses blocked for the subscriber class/prefix. Thus, the network device conserves computing resources, networking resources, and/or the like that would otherwise have been consumed by failing to filter different sets of blacklisted network addresses for different subscribers, erroneously providing blacklisted traffic to the different subscribers associated with the different sets of blacklisted network addresses, handling network outages caused by the blacklisted traffic, handling compromised endpoint devices caused by the blacklisted traffic, and/or the like.

FIGS. 1A-1E are diagrams of an example 100 associated with providing subscriber aware network address filtering using an open configuration RPC framework. As shown in FIGS. 1A-1E, example 100 includes a plurality of endpoint devices, a server device, and a network with a plurality of network devices. In some implementations, the plurality of endpoint devices may include a first endpoint device (e.g., endpoint device 1) associated with a first subscriber (e.g., subscriber 1) and a second endpoint device (e.g., endpoint device 2) associated with a second subscriber (e.g., subscriber 2). Further details of the endpoint devices, the server device, the network, and the network devices are provided elsewhere herein.

Figure 1A:
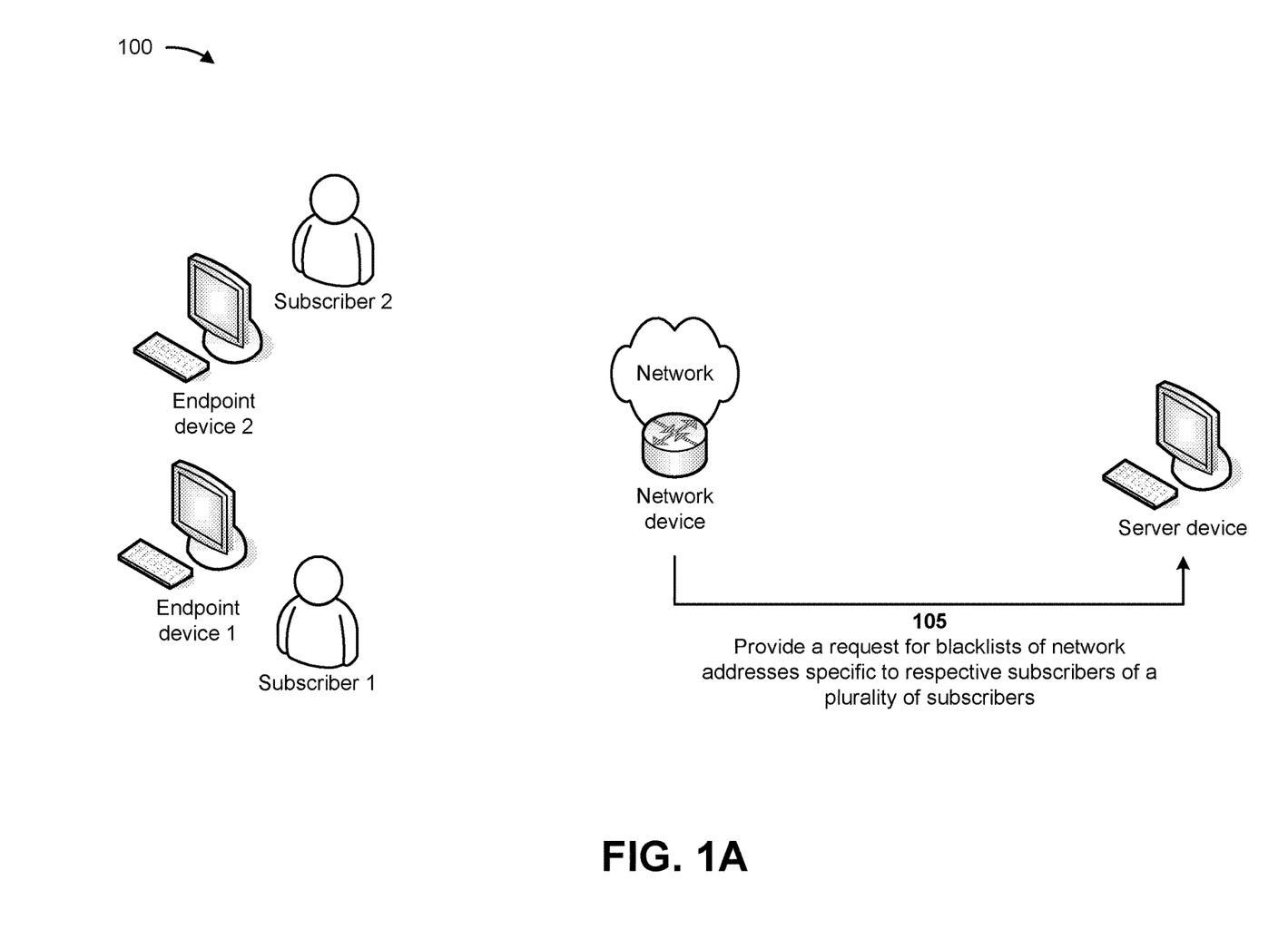
FIGS. 1A-1E are diagrams of an example associated with providing subscriber aware network address filtering using an open configuration remote procedure call (RPC) framework.

As shown in FIG. 1A, and by reference number 105, the network device may provide a request for blacklists of network addresses specific to respective subscribers of a plurality of subscribers. For example, the network device may generate the request for blacklists of network addresses specific to respective subscribers of a plurality of subscribers. In some implementations, the network device may utilize the open configuration gRPC framework to generate an open configuration RPC request for blacklists of network addresses specific to respective subscribers of the plurality of subscribers. In some implementations, the network device may utilize a transmission control protocol (TCP)-based client-server dynamic subscription solution to generate the request for blacklists of network addresses specific to respective subscribers of the plurality of subscribers.

In some implementations, the request may include a request for subscriber classes or prefixes specific to the respective subscribers (e.g., network addresses of the endpoint devices of the respective subscribers), the blacklists of network addresses specific to the respective subscribers, streaming requirements for telemetry data associated with the blacklists of network addresses specific to the respective subscribers, and/or the like. The network device may provide, to the server device, the request for blacklists of network addresses specific to respective subscribers of the plurality of subscribers, and the server device may receive the request.

Figure 1B:
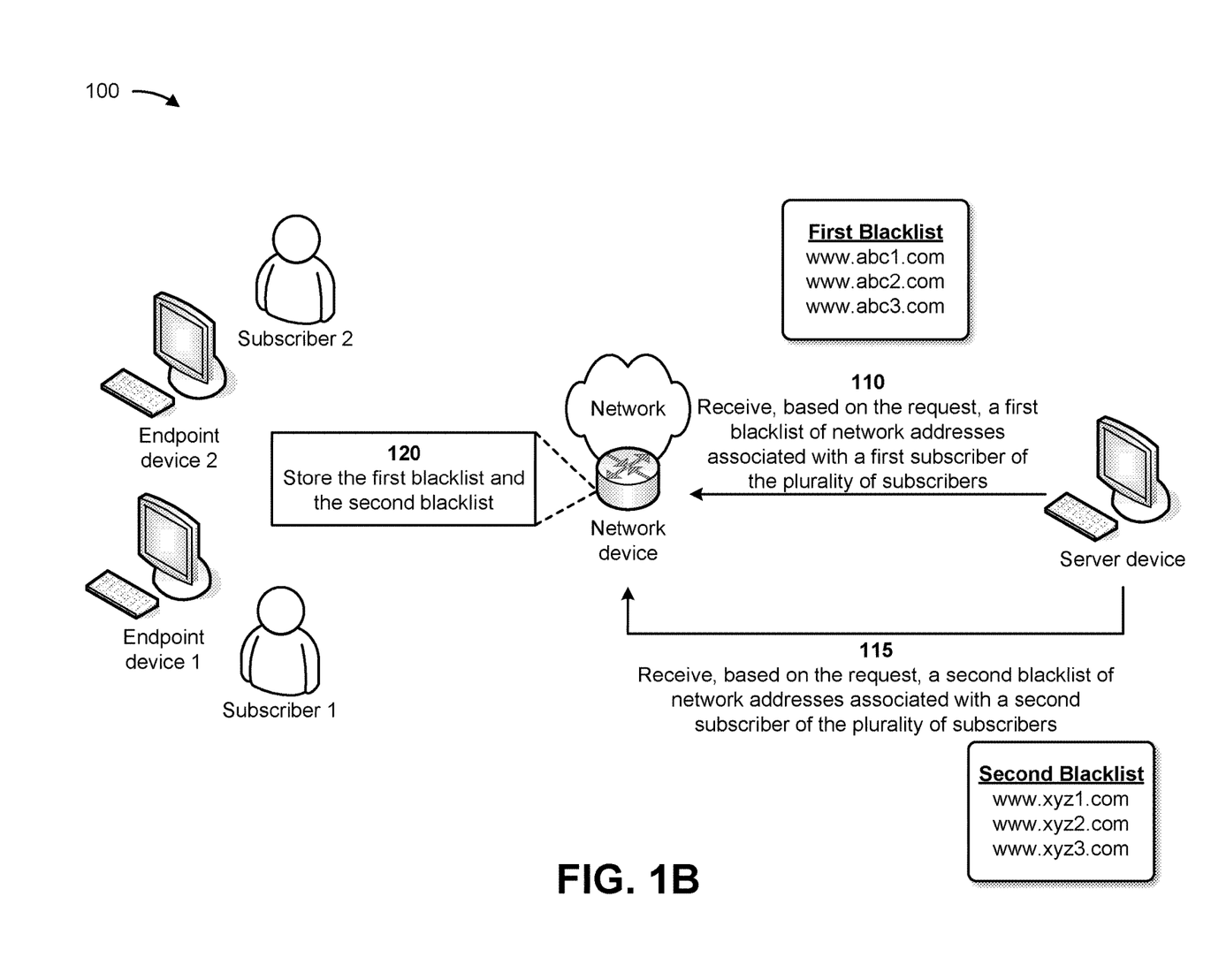

As shown in FIG. 1B, and by reference number 110, the network device may receive, based on the request, a first blacklist of network addresses associated with a first subscriber of the plurality of subscribers. For example, the server device may identify, based on the request, subscriber classes or prefixes specific to the respective subscribers (e.g., network addresses of the endpoint devices of the respective subscribers), the blacklists of network addresses specific to the respective subscribers, the streaming requirements for telemetry data associated with the blacklists of network addresses specific to the respective subscribers, and/or the like. The server device may provide the subscriber classes or prefixes specific to the respective subscribers, the blacklists of network addresses specific to the respective subscribers, the streaming requirements for telemetry data associated with the blacklists of network addresses specific to the respective subscribers, and/or the like to the network device, and the network device may receive the information.

In some implementations, the network device may receive, from the server device and based on the request, the subscriber class or prefix of the first subscriber of the plurality of subscribers, the first blacklist of network addresses associated with the first subscriber, the streaming requirements for telemetry data associated with the first blacklist, and/or the like. The first blacklist may include URLs to be blocked by the network device for the first subscriber, such as www.abc1.com, www.abc2.com, www.abc3.com, and/or the like.

As further shown in FIG. 1B, and by reference number 115, the network device may receive, based on the request, a second blacklist of network addresses associated with a second subscriber of the plurality of subscribers. For example, the network device may receive, from the server device and based on the request, the subscriber class or prefix of the second subscriber of the plurality of subscribers, the second blacklist of network addresses associated with the second subscriber, the streaming requirements for telemetry data associated with the second blacklist, and/or the like. The second blacklist may include URLs to be blocked by the network device for the second subscriber, such as www.xyz1.com, www.xyz2.com, www.xyz3.com, and/or the like.

As further shown in FIG. 1B, and by reference number 120, the network device may store the first blacklist and the second blacklist. For example, the network device may store the first blacklist and the second blacklist in the network address (e.g., URL) database provided in the network device. In some implementations, the network device may store the first blacklist and the second blacklist in the data structure associated with the network device. Traffic associated with the network addresses provided in the first blacklist may be prevented by the network device from reaching the endpoint device associated with the first subscriber. Traffic associated with the network addresses provided in the second blacklist may be prevented by the network device from reaching the endpoint device associated with the second subscriber.

Figure 1C:
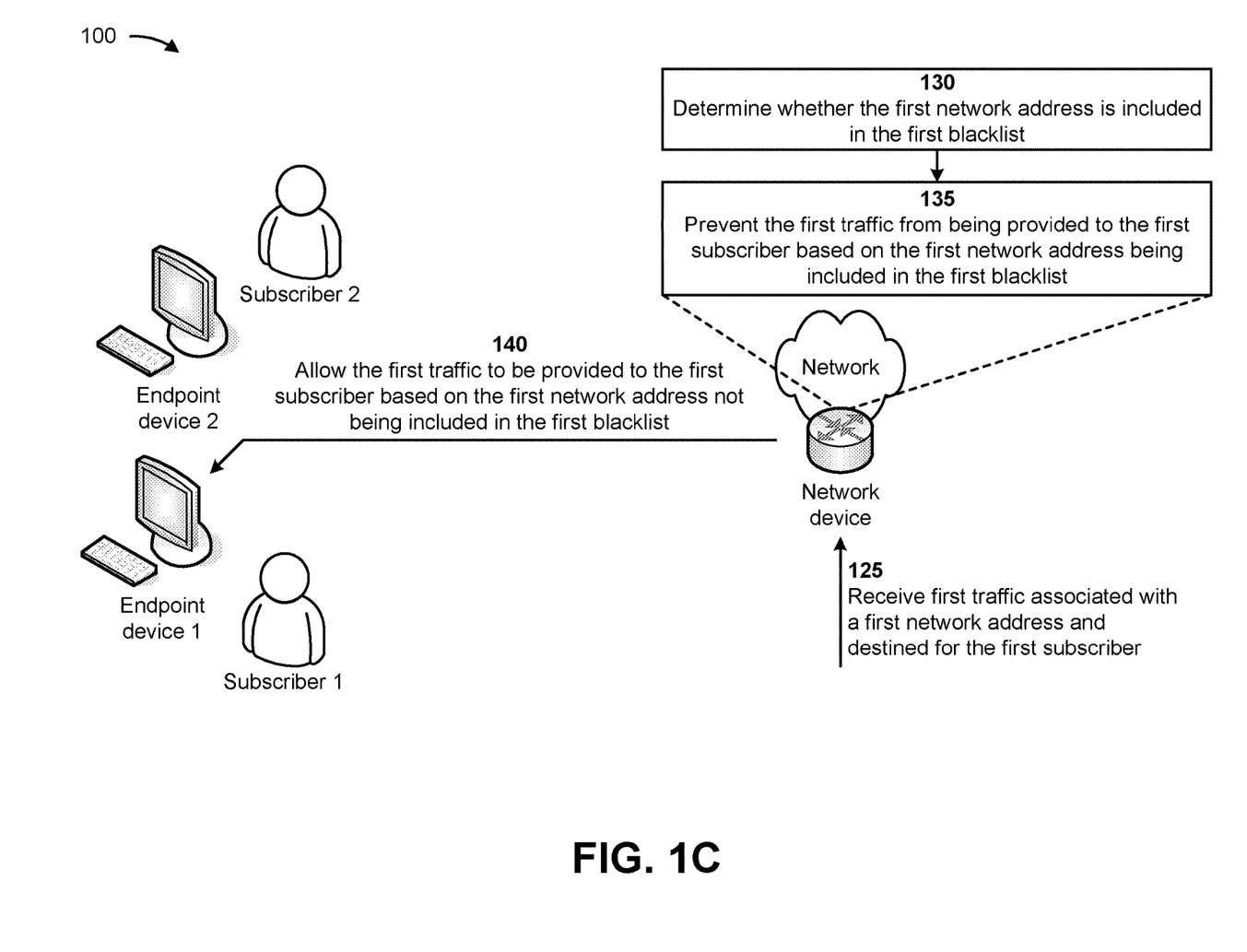

As shown in FIG. 1C, and by reference number 125, the network device may receive first traffic associated with a first network address and destined for the first subscriber. For example, the first traffic may be associated with a first network address (e.g., a source address of the first traffic) and may be destined for the endpoint device associated with the first subscriber (e.g., via a destination address). The network device may receive the first traffic associated with the first network address and destined for the endpoint device associated with first subscriber, and may process the first traffic. In some implementations, the first traffic may include or be associated with telemetry data.

As further shown in FIG. 1C, and by reference number 130, the network device may determine whether the first network address is included in the first blacklist. For example, when processing the first traffic, the network device may determine whether the first network address matches a network address included in the first blacklist of network addresses. In some implementations, the network device may determine that the first network address matches a network address included in the first blacklist of network addresses (e.g., is included in the first blacklist). Alternatively, the network device may determine that the first network address fails to match a network address included in the first blacklist of network addresses (e.g., is not included in the first blacklist).

As further shown in FIG. 1C, and by reference number 135, the network device may prevent the first traffic from being provided to the first subscriber based on the first network address being included in the first blacklist. For example, when the network device determines that the first network address matches a network address included in the first blacklist (e.g., is included in the first blacklist), the network device may prevent the first traffic from being provided to the endpoint device associated with the first subscriber. In some implementations, the network device may store the first network address in a list of network addresses blocked by the network device, and may discard the first traffic.

As further shown in FIG. 1C, and by reference number 140, the network device may allow the first traffic to be provided to the first subscriber based on the first network address not being included in the first blacklist. For example, when the network device determines that the first network address fails to match a network address included in the first blacklist (e.g., is not included in the first blacklist), the network device may allow the first traffic to be provided to the endpoint device associated with the first subscriber. In some implementations, the network device may cause the first traffic to be routed to the endpoint device associated with the first subscriber, and the endpoint device may receive the first traffic.

Figure 1D:
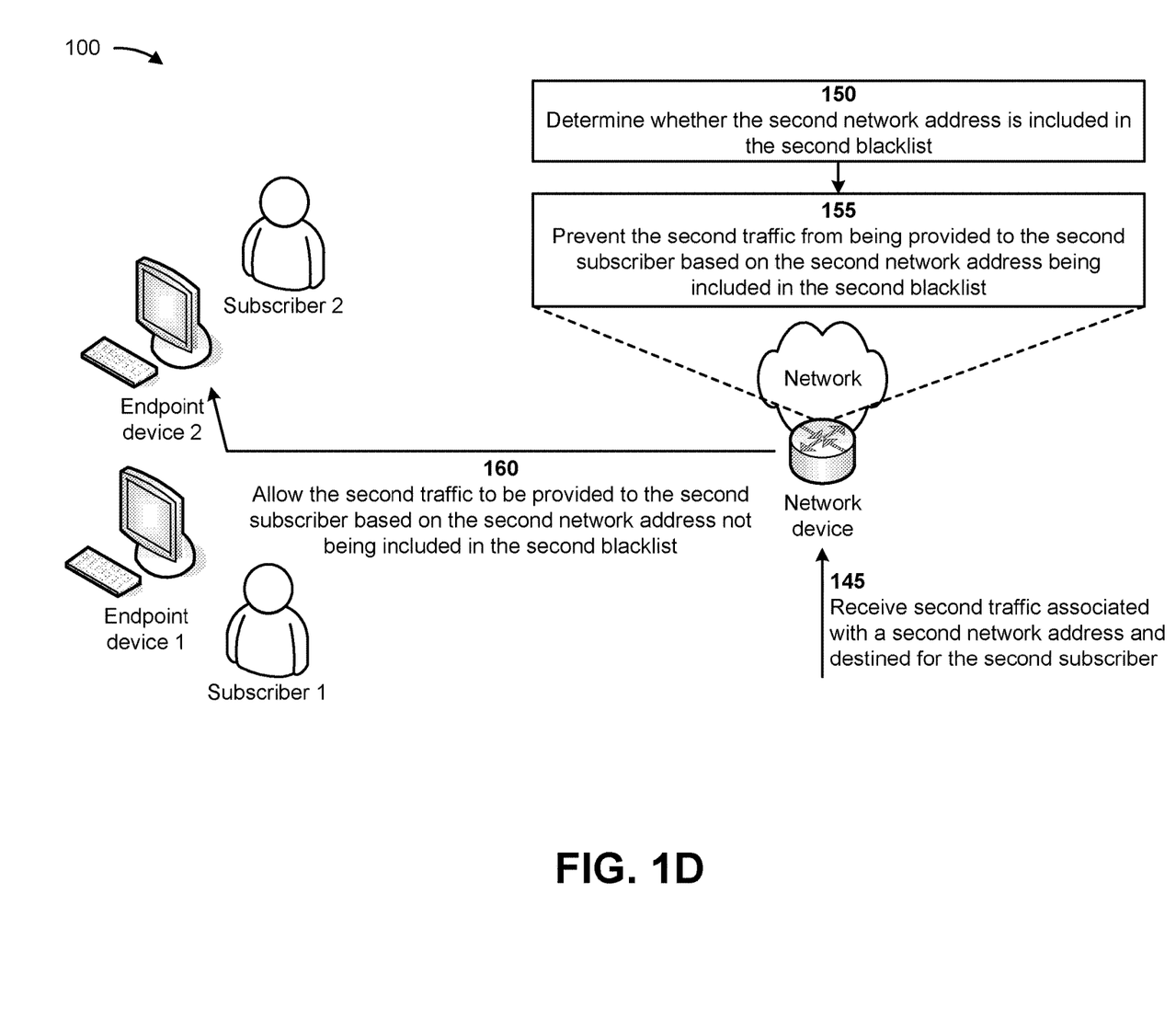

As shown in FIG. 1D, and by reference number 145, the network device may receive second traffic associated with a second network address and destined for the second subscriber. For example, the second traffic may be associated with a second network address (e.g., a source address of the second traffic) and may be destined for the endpoint device associated with the second subscriber (e.g., via a destination address). The network device may receive the second traffic associated with the second network address and destined for the endpoint device associated with second subscriber, and may process the second traffic. In some implementations, the second traffic may include or be associated with telemetry data.

As further shown in FIG. 1D, and by reference number 150, the network device may determine whether the second network address is included in the second blacklist. For example, when processing the second traffic, the network device may determine whether the second network address matches a network address included in the second blacklist of network addresses. In some implementations, the network device may determine that the second network address matches a network address included in the second blacklist of network addresses (e.g., is included in the second blacklist). Alternatively, the network device may determine that the second network address fails to match a network address included in the second blacklist of network addresses (e.g., is not included in the second blacklist).

As further shown in FIG. 1D, and by reference number 155, the network device may prevent the second traffic from being provided to the second subscriber based on the second network address being included in the second blacklist. For example, when the network device determines that the second network address matches a network address included in the second blacklist (e.g., is included in the second blacklist), the network device may prevent the second traffic from being provided to the endpoint device associated with the second subscriber. In some implementations, the network device may store the second network address in the list of network addresses blocked by the network device, and may discard the second traffic.

As further shown in FIG. 1D, and by reference number 160, the network device may allow the second traffic to be provided to the second subscriber based on the second network address not being included in the second blacklist. For example, when the network device determines that the second network address fails to match a network address included in the second blacklist (e.g., is not included in the second blacklist), the network device may allow the second traffic to be provided to the endpoint device associated with the second subscriber. In some implementations, the network device may cause the second traffic to be routed to the endpoint device associated with the second subscriber, and the endpoint device may receive the second traffic.

Figure 1E:
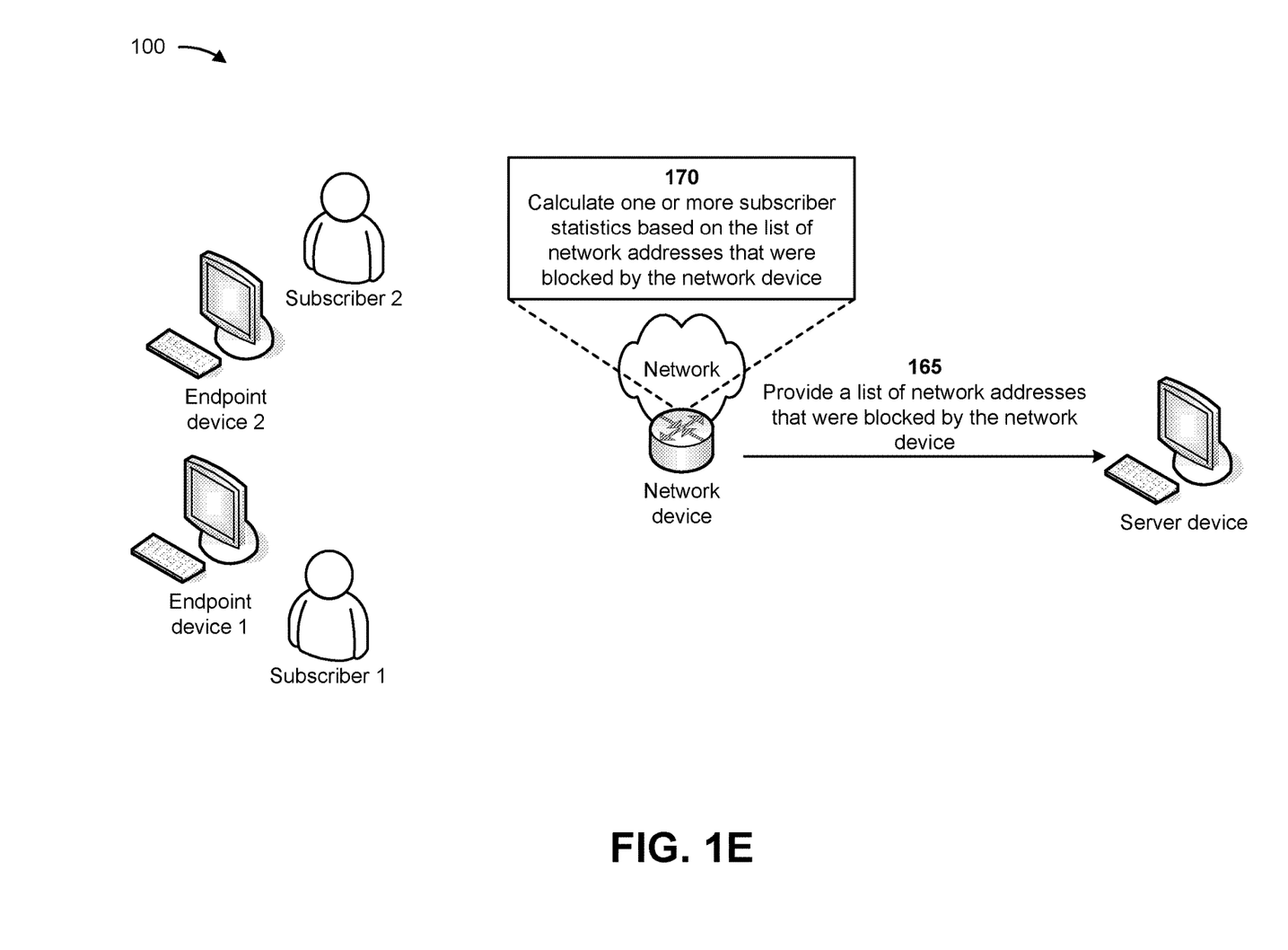

As shown in FIG. 1E, and by reference number 165, the network device may provide a list of network addresses that were blocked by the network device. For example, the network device may provide the list of network addresses that were blocked by the network device to the server device, and the server device may receive the list. In some implementations, the server device may calculate one or more subscriber statistics based on the list of network addresses that were blocked by the network device. For example, the server device may calculate a quantity of blocked network addresses per subscriber based on the list. In some implementations, after every sampling frequency interval, the network device may can provide a subscriber identifier or a subscriber prefix, along with the list of network addresses blocked for the subscriber identifier/subscriber prefix.

As further shown in FIG. 1E, and by reference number 170, the network device may calculate one or more subscriber statistics based on the list of network addresses that were blocked by the network device. For example, rather than providing the list of network addresses that were blocked by the network device to the server device, the network device may calculate one or more subscriber statistics based on the list of network addresses that were blocked by the network device. For example, the network device may identify a subscriber with a largest quantity of blocked network addresses based on the list.

In this way, the network device provides subscriber aware network address filtering using an open configuration RPC framework. For example, the network device may provide a subscriber class and/or prefix (e.g., or an identifier of a subscriber) aware network address filtering of blacklisted traffic for specific subscribers. The network device may utilize the open configuration gRPC framework for subscribing to a subscriber class/prefix, blacklisted network addresses associated with the subscriber class/prefix, and streaming requirements for telemetry data associated with the blacklisted network addresses blocked for the subscriber class/prefix. The network device may also provide network address filtering for bidirectional traffic (e.g., from subscriber to the server device or from the server device to the subscriber). Thus, the network device conserves computing resources, networking resources, and/or the like that would otherwise have been consumed by failing to filter different sets of blacklisted network addresses for different subscribers, erroneously providing blacklisted traffic to the different subscribers associated with the different sets of blacklisted network addresses, handling network outages caused by the blacklisted traffic, handling compromised endpoint devices caused by the blacklisted traffic, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
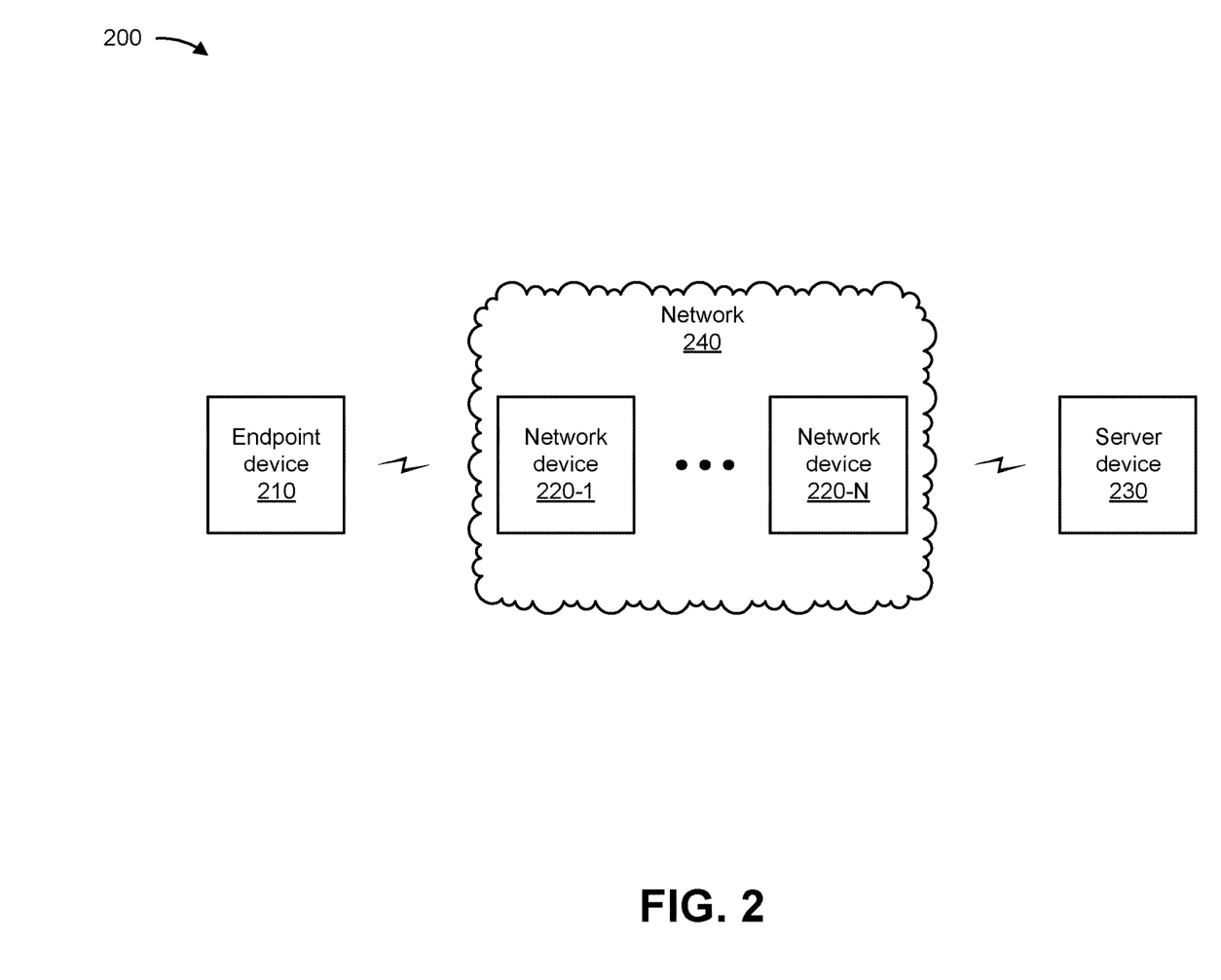
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include endpoint devices 210, a group of network devices 220 (shown as network device 220-1 through network device 220-N), a server device 230, and a network 240. Devices of the environment 200 may interconnect via wired connections, wireless connections, or a combination of wired and wireless connections.

The endpoint device 210 includes one or more devices capable of receiving, generating, storing, processing, and/or providing information, such as information described herein. For example, the endpoint device 210 may include a mobile phone (e.g., a smart phone or a radiotelephone), a set-top box, a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device (e.g., a router, a residential gateway, and/or the like), or a similar type of device. In some implementations, the endpoint device 210 may receive network traffic from and/or may provide network traffic to the server device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The server device 230 may include one or more devices capable of receiving, generating, storing, processing, providing, and/or routing information, as described elsewhere herein. The server device 230 may include a communication device and/or a computing device. For example, the server device 230 may include a server, such as an application server, a client server, a web server, a database server, a host server, a proxy server, a virtual server (e.g., executing on computing hardware), or a server in a cloud computing system. In some implementations, the server device 230 may include computing hardware used in a cloud computing environment.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, and/or a third generation (3G) network), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
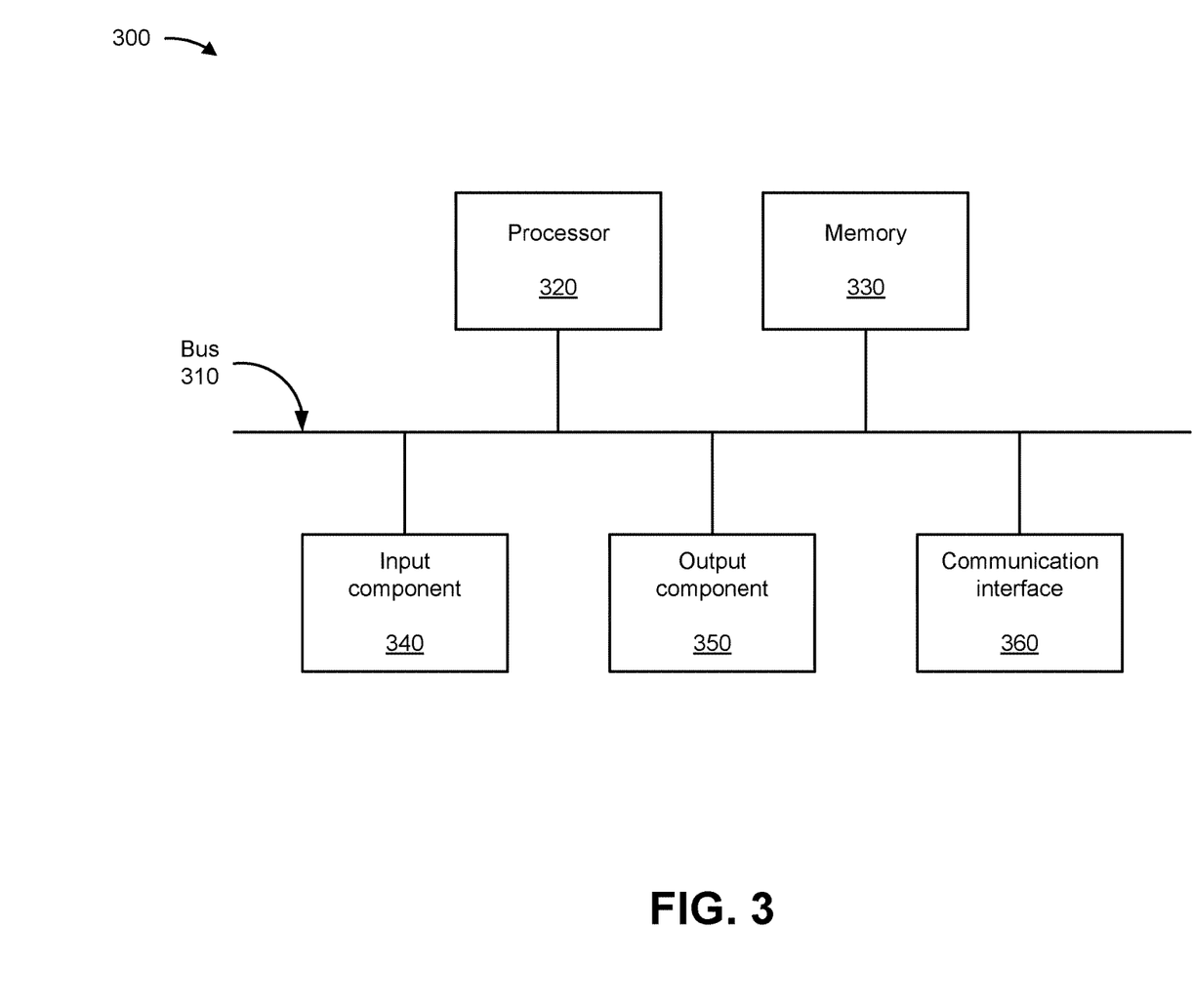
FIGS. 3 and 4 are diagrams of example components of one or more devices of FIG. 2.

FIG. 3 is a diagram of example components of one or more devices of FIG. 2. The example components may be included in a device 300, which may correspond to the endpoint device 210, the network device 220, and/or the server device 230. In some implementations, the endpoint device 210, the network device 220, and/or the server device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit (CPU), a graphics processing unit (GPU), a microprocessor, a controller, a microcontroller, a digital signal processor (DSP), a field-programmable gate array (FPGA), an application-specific integrated circuit (ASIC), and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
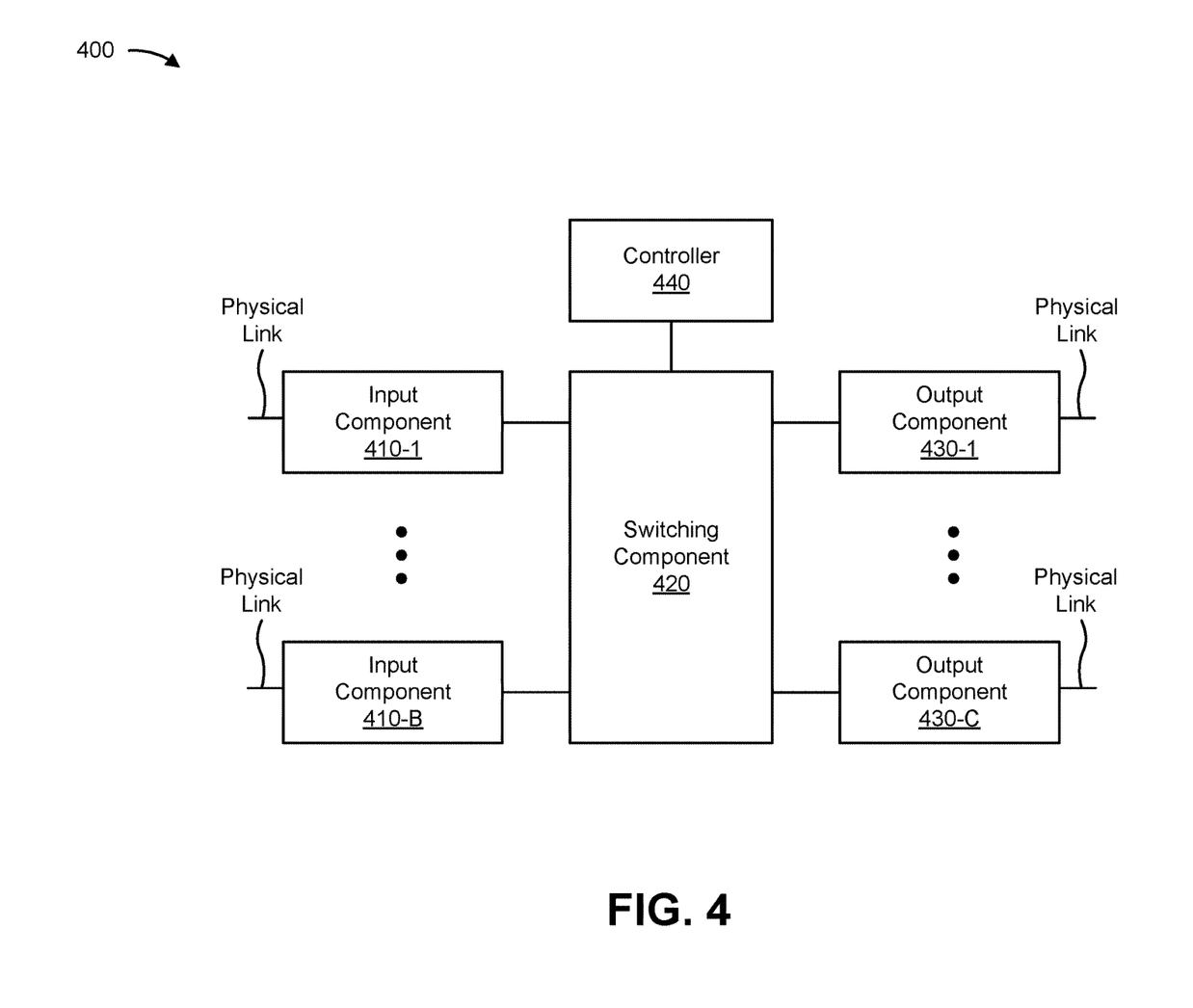

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an accelerated processing unit (APU), a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
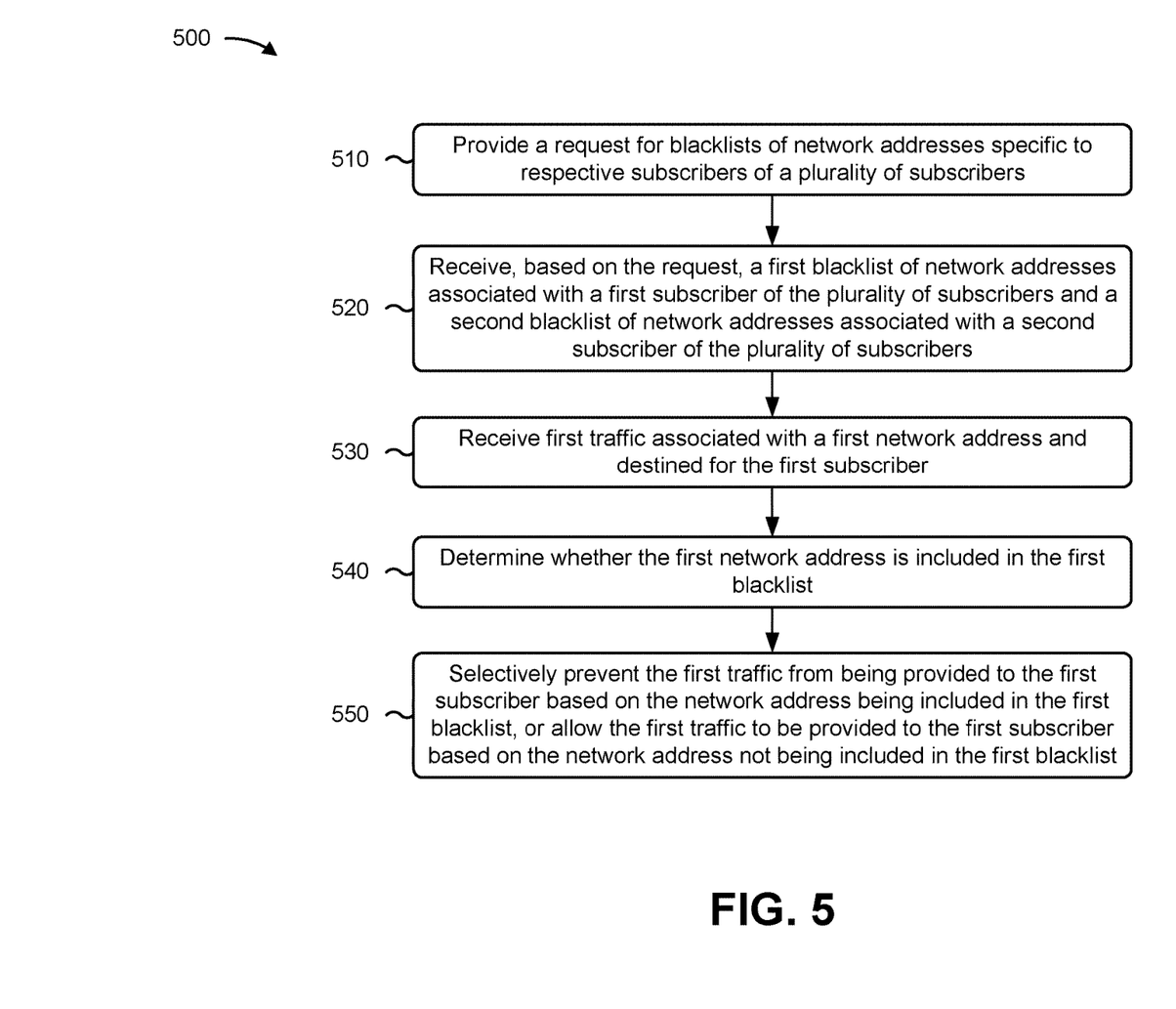
FIG. 5 is a flowchart of an example process for providing subscriber aware network address filtering using an open configuration RPC framework.

FIG. 5 is a flowchart of an example process 500 for providing subscriber aware network address filtering using an open configuration RPC framework. In some implementations, one or more process blocks of FIG. 5 may be performed by a network device (e.g., the network device 220). In some implementations, one or more process blocks of FIG. 5 may be performed by another device or a group of devices separate from or including the network device, such as an endpoint device (e.g., the endpoint device 210) and/or a server device (e.g., the server device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As further shown in FIG. 5, process 500 may include providing a request for blacklists of network addresses specific to respective subscribers of a plurality of subscribers (block 510). For example, the network device may provide a request for blacklists of network addresses specific to respective subscribers of a plurality of subscribers, as described above. In some implementations, the request is a subscription request subscribing to the first subscriber, the first blacklist, the second subscriber, and the second blacklist. In some implementations, the request is an open configuration remote procedure call request subscribing to the first subscriber, the first blacklist, the second subscriber, and the second blacklist.

As further shown in FIG. 5, process 500 may include receiving, based on the request, a first blacklist of network addresses associated with a first subscriber of the plurality of subscribers and a second blacklist of network addresses associated with a second subscriber of the plurality of subscribers (block 520). For example, the network device may receive, based on the request, a first blacklist of network addresses associated with a first subscriber of the plurality of subscribers and a second blacklist of network addresses associated with a second subscriber of the plurality of subscribers, as described above. In some implementations, the first subscriber and the second subscriber are associated with different subscriber classes or prefixes.

In some implementations, receiving, based on the request, the first blacklist of network addresses associated with the first subscriber includes receiving, based on the request, a subscriber class or prefix associated with the first subscriber, and receiving, based on the request, streaming requirements of telemetry data associated with the first blacklist of network addresses. In some implementations, receiving, based on the request, the second blacklist of network addresses associated with the second subscriber includes receiving, based on the request, a subscriber class or prefix associated with the second subscriber, and receiving, based on the request, streaming requirements of telemetry data associated with the second blacklist of network addresses.

As further shown in FIG. 5, process 500 may include receiving first traffic associated with a first network address and destined for the first subscriber (block 530). For example, the network device may receive first traffic associated with a first network address and destined for the first subscriber, as described above. In some implementations, the first traffic includes telemetry data.

As further shown in FIG. 5, process 500 may include determining whether the first network address is included in the first blacklist (block 540). For example, the network device may determine whether the first network address is included in the first blacklist, as described above.

As further shown in FIG. 5, process 500 may include selectively preventing the first traffic from being provided to the first subscriber based on the network address being included in the first blacklist, or allowing the first traffic to be provided to the first subscriber based on the network address not being included in the first blacklist (block 560). For example, the network device may selectively prevent the first traffic from being provided to the first subscriber based on the network address being included in the first blacklist, or allow the first traffic to be provided to the first subscriber based on the network address not being included in the first blacklist, as described above.

In some implementations, process 500 includes storing the first blacklist of network addresses and the second blacklist of network addresses.

In some implementations, process 500 includes receiving second traffic associated with a second network address and destined for the second subscriber; determining whether the second network address is included in the second blacklist; and selectively preventing the second traffic from being provided to the second subscriber based on the second network address being included in the second blacklist, or allowing the second traffic to be provided to the second subscriber based on the second network address not being included in the second blacklist. In some implementations, the second traffic includes telemetry data.

In some implementations, process 500 includes providing a list of network addresses that were blocked by the network device to a server device, where the server device is configured to calculate one or more subscriber statistics based on the list of network addresses that were blocked by the network device. In some implementations, process 500 includes calculating one or more subscriber statistics based on a list of network addresses that were blocked by the network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    providing, by a network device, a request for blacklists of network addresses,
        wherein the blacklists are specific to respective subscribers of a plurality of subscribers;
    receiving, by the network device based on the request, a first blacklist of network addresses associated with a first subscriber of the plurality of subscribers, a second blacklist of network addresses associated with a second subscriber of the plurality of subscribers, and a subscriber class or prefix associated with the first subscriber or the second subscriber;
    receiving, by the network device, first traffic associated with a first network address and destined for the first subscriber;
    determining, by the network device, whether the first network address is included in the first blacklist; and
    selectively:
        preventing, by the network device, the first traffic from being provided to the first subscriber based on the first network address being included in the first blacklist, or
        allowing, by the network device, the first traffic to be provided to the first subscriber based on the first network address not being included in the first blacklist.

2. The method of claim 1, wherein the request is a subscription request subscribing to the first subscriber, the first blacklist, the second subscriber, and the second blacklist.

3. The method of claim 1, wherein the request is an open configuration remote procedure call request subscribing to the first subscriber, the first blacklist, the second subscriber, and the second blacklist.

4. The method of claim 1, further comprising:
    storing the first blacklist of network addresses and the second blacklist of network addresses.

5. The method of claim 1, further comprising:
    receiving second traffic associated with a second network address and destined for the second subscriber;
    determining whether the second network address is included in the second blacklist; and selectively:
　preventing the second traffic from being provided to the second subscriber based on the second network address being included in the second blacklist, or
　allowing the second traffic to be provided to the second subscriber based on the second network address not being included in the second blacklist.

6. The method of claim 5, wherein the second traffic includes telemetry data.

7. The method of claim 1, further comprising:
providing, to a server device, a list of network addresses that were prevented from being provided to a subscriber by the network device,
　wherein the server device is configured to calculate one or more subscriber statistics based on the list of network addresses that were prevented from being provided to a subscriber by the network device.

8. A network device, comprising:
one or more memories; and
one or more processors to:
　provide a request for blacklists of network addresses specific to respective subscribers of a plurality of subscribers;
　receive, based on the request, a first blacklist of network addresses associated with a first subscriber of the plurality of subscribers and a second blacklist of network addresses associated with a second subscriber of the plurality of subscribers,
　　wherein the request is a subscription request subscribing to the first subscriber, the first blacklist, the second subscriber, and the second blacklist;
　receive first traffic associated with a first network address and destined for the first subscriber;
　determine whether the first network address is included in the first blacklist; and
　selectively:
　　prevent the first traffic from being provided to the first subscriber based on the first network address being included in the first blacklist, or
　　allow the first traffic to be provided to the first subscriber based on the first network address not being included in the first blacklist.

9. The network device of claim 8, wherein the one or more processors are further to:
calculate one or more subscriber statistics based on a list of network addresses that were prevented from being provided to a subscriber by the network device.

10. The network device of claim 8, wherein the first traffic includes telemetry data.

11. The network device of claim 8, wherein the plurality of subscribers are associated with a corresponding plurality of endpoint devices.

12. The network device of claim 8, wherein the one or more processors, to receive, based on the request, the first blacklist of network addresses associated with the first subscriber, are to:
receive, based on the request, a subscriber class or prefix associated with the first subscriber; and
receive, based on the request, streaming requirements of telemetry data associated with the first blacklist of network addresses.

13. The network device of claim 8, wherein the one or more processors, to receive, based on the request, the second blacklist of network addresses associated with the second subscriber, are to:
receive, based on the request, a subscriber class or prefix associated with the second subscriber; and
receive, based on the request, streaming requirements of telemetry data associated with the second blacklist of network addresses.

14. The network device of claim 8, wherein the first subscriber and the second subscriber are associated with different subscriber classes or prefixes.

15. A non-transitory computer-readable medium storing a set of instructions, the set of instructions comprising:
one or more instructions that, when executed by one or more processors of a network device, cause the network device to:
　provide a request for blacklists of network addresses specific to respective subscribers of a plurality of subscribers;
　receive, based on the request, a first blacklist of network addresses associated with a first subscriber of the plurality of subscribers and a second blacklist of network addresses associated with a second subscriber of the plurality of subscribers,
　　wherein the request is an open configuration remote procedure call subscribing to the first subscriber, the first blacklist, the second subscriber, and the second blacklist;
　receive first traffic associated with a first network address and destined for the first subscriber;
　determine whether the first network address is included in the first blacklist; and
　selectively:
　　prevent the first traffic from being provided to the first subscriber based on the first network address being included in the first blacklist, or
　　allow the first traffic to be provided to the first subscriber based on the first network address not being included in the first blacklist.

16. The non-transitory computer-readable medium of claim 15, wherein the one or more instructions further cause the network device to:
receive second traffic associated with a second network address and destined for the second subscriber;
determine whether the second network address is included in the second blacklist; and
selectively:
　prevent the second traffic from being provided to the second subscriber based on the second network address being included in the second blacklist, or
　allow the second traffic to be provided to the second subscriber based on the second network address not being included in the second blacklist.

17. The non-transitory computer-readable medium of claim 15, wherein the one or more instructions further cause the network device to:
provide, to a server device, a list of network addresses that were prevented from being provided to a subscriber by the network device,
　wherein the one or more instructions further cause the network device to calculate one or more subscriber statistics based on the list of network addresses that were prevented from being provided by the network device.

18. The non-transitory computer-readable medium of claim 15, wherein the one or more instructions further cause the network device to:
calculate one or more subscriber statistics based on a list of network addresses that were prevented from being provided to a subscriber by the network device.

19. The non-transitory computer-readable medium of claim 15, wherein the one or more instructions, that cause the network device to receive, based on the request, the first blacklist of network addresses associated with the first subscriber, cause the network device to:
  receive, based on the request, a subscriber class or prefix associated with the first subscriber; and
  receive, based on the request, streaming requirements of telemetry data associated with the first blacklist of network addresses.

20. The non-transitory computer-readable medium of claim 15, wherein the one or more instructions, that cause the network device to receive, based on the request, the second blacklist of network addresses associated with the second subscriber, cause the network device to:
  receive, based on the request, a subscriber class or prefix associated with the second subscriber; and
  receive, based on the request, streaming requirements of telemetry data associated with the second blacklist of network addresses.

* * * * *